(12) United States Patent
Qu et al.

(10) Patent No.: US 11,781,863 B2
(45) Date of Patent: Oct. 10, 2023

(54) SYSTEMS AND METHODS FOR POSE DETERMINATION

(71) Applicant: BEIJING DIDI INFINITY TECHNOLOGY AND DEVELOPMENT CO., LTD., Beijing (CN)

(72) Inventors: Xiaozhi Qu, Beijing (CN); Lu Feng, Beijing (CN); Teng Ma, Beijing (CN); Baoli Li, Beijing (CN)

(73) Assignee: BEIJING DIDI INFINITY TECHNOLOGY AND DEVELOPMENT CO., LTD., Beijing (CN)

(*) Notice: Subject to any disclaimer, the term of this patent is extended or adjusted under 35 U.S.C. 154(b) by 564 days.

(21) Appl. No.: 17/039,803

(22) Filed: Sep. 30, 2020

(65) Prior Publication Data
US 2021/0019535 A1    Jan. 21, 2021

Related U.S. Application Data

(63) Continuation of application No. PCT/CN2019/091829, filed on Jun. 19, 2019.

(30) Foreign Application Priority Data

Jun. 19, 2018 (CN) .......................... 201810631712.1

(51) Int. Cl.
*G06T 7/73* (2017.01)
*G01C 11/06* (2006.01)
(Continued)

(52) U.S. Cl.
CPC .............. *G01C 11/06* (2013.01); *G01C 21/32* (2013.01); *G01C 21/3461* (2013.01);
(Continued)

(58) Field of Classification Search
CPC .. G06T 7/30; G06T 7/33; G06T 7/337; G06T 7/70; G06T 7/73; G06T 7/74;
(Continued)

(56) References Cited

U.S. PATENT DOCUMENTS 9,488,483 B2   11/2016   Ranganathan et al.
9,940,729 B1    4/2018   Kwant et al.
(Continued)

FOREIGN PATENT DOCUMENTS

CN   102693676 A   9/2012
CN   104374395 A   2/2015
(Continued)

OTHER PUBLICATIONS

First Office Action in Chinese Application No. 201810631712.1 dated Jan. 28, 2021, 13 pages.
(Continued)

*Primary Examiner* — Andrew W Johns
(74) *Attorney, Agent, or Firm* — METIS IP LLC

(57) ABSTRACT

The present disclosure provides a method for pose determination. The method may include obtaining a first pose of a subject at a first time point. The method may further include retrieving one or more first features associated with a road from a database. The road may be viewable by the subject at the first pose and at the first time point. The method may further include obtaining an image captured by the subject at a second time point. The method may further include extracting one or more second features associated with the road from the image. The method may also include determining a second pose of the subject at the second time point at least based on comparing the one or more first features associated with the road with the one or more second features associated with the road.

20 Claims, 7 Drawing Sheets

(51) Int. Cl.
  *G01C 21/32* (2006.01)
  *G01C 21/34* (2006.01)
  *G01C 21/36* (2006.01)
  *G06V 20/56* (2022.01)
  *G01S 19/48* (2010.01)
  *G06F 18/00* (2023.01)

(52) U.S. Cl.
  CPC ........ *G01C 21/3602* (2013.01); *G01S 19/485* (2020.05); *G06F 18/00* (2023.01); *G06T 7/73* (2017.01); *G06V 20/56* (2022.01); *G06T 2207/30256* (2013.01)

(58) Field of Classification Search
  CPC .......... G06T 2207/30244; G06V 20/56; G06V 20/588; G05D 1/0231; G05D 1/0246; G05D 1/0253
  See application file for complete search history.

(56) References Cited

U.S. PATENT DOCUMENTS

| | | |
|---|---|---|
| 10,121,247 B2 | 11/2018 | Meier et al. |
| 2005/0232467 A1 | 10/2005 | Mohri et al. |
| 2008/0240506 A1* | 10/2008 | Nakamura et al. .. G06V 20/582 382/104 |
| 2008/0240573 A1* | 10/2008 | Nakamura et al. .. G06V 20/588 382/190 |
| 2008/0310680 A1 | 12/2008 | Azuma |
| 2013/0321688 A1 | 12/2013 | Nishimura et al. |
| 2017/0186186 A1 | 6/2017 | Yamaguchi et al. |
| 2018/0031387 A1 | 2/2018 | Scherer et al. |

FOREIGN PATENT DOCUMENTS

| | | |
|---|---|---|
| CN | 106352877 A | 1/2017 |
| CN | 106846467 A | 6/2017 |
| CN | 107888828 A | 4/2018 |
| CN | 108020225 A | 5/2018 |
| JP | 2011232515 A | 11/2011 |

OTHER PUBLICATIONS

Euntae Hong et al., Visual Inertial Odometry with Robust Initialization and Online Scale Estimation, Sensors, 18 (12), 16 pages, 2018.

Quan, Meixiang et al., Accurate Monocular Visual-inertial SLAM using a Map-assisted EKF Approach, IEEE Access, 7: 34289-34300, 2019.

International Search Report in PCT/CN2013/091829 dated Sep. 26, 2013, 5 pages.

Written Opinion in PCT/CN2019/091829 dated Sep. 26, 2019, 4 pages.

* cited by examiner

SYSTEMS AND METHODS FOR POSE DETERMINATION

CROSS-REFERENCE TO RELATED APPLICATION

This application is a continuation of International Application No. PCT/CN2019/091829 filed on Jun. 19, 2019, which claims priority of Chinese Patent Application No. 201810631712.1 filed on Jun. 19, 2018, the entire contents of which are hereby incorporated by reference.

TECHNICAL FIELD

The present disclosure generally relates to systems and methods for positioning and navigation, and in particular, to systems and methods for determining a pose of a subject.

BACKGROUND

Precise positioning and navigation is one of the core technologies for applications such as autonomous driving, robotics and mobile measurement. At present, the Global Navigation Satellite System (GNSS) and the high-precision Inertial Navigation System (INS) are widely used for positioning and navigation. The GNSS and the high-precision INS may provide positioning and navigation services with high accuracy, but with relatively high cost. It is desired to provide a positioning technique that provides a high positioning accuracy with low cost.

SUMMARY

According to an aspect of the present disclosure, a system is provided. The system may include at least one storage medium including a set of instructions and at least one processor in communication with the at least one storage medium. When executing the instructions, the at least one processor may be configured to direct the system to perform operations. The operations may include obtaining a first pose of a subject at a first time point. The operations may further include retrieving one or more first features associated with a road from a database. The first road may be viewable by the subject at the first pose and at the first time point. The operations may further include obtaining an image captured by the subject at a second time point. The operations may further include extracting one or more second features associated with the road from the image. And the operations may also include determining a second pose of the subject at the second time point at least based on comparing the one or more first features associated with the road with the one or more second features associated with the road.

In some embodiments, the obtaining the first pose of the subject at the first time point may include determining a preliminary pose of the subject at the first time point, retrieving one or more third features associated with the road from the database based on the preliminary pose of the subject, obtaining a second image captured by the subject at the first time point, extracting one or more fourth features associated with the road from the second image, and determining the first pose of the subject at the first time point based on the one or more third features associated with the road and the one or more fourth features associated with the road.

In some embodiments, the at least one processor may be further configured to direct the system to perform operations. The operations may include determining a first location of the subject at the first time point and a second location of the subject at the second time point. And the operations may further include determining that the image captured by the subject at the second time point is a key frame on occurrence that a distance between the first location of the subject and the second location of the subject is larger than or equal to a first threshold.

In some embodiments, the at least one processor may be further configured to direct the system to perform operations. The operations may include determining that the image captured by the subject at the second time point is a key frame on occurrence that a match score between the image captured by the subject at the second time point and the second image captured by the subject at the first time point is below a second threshold.

In some embodiments, the one or more first features or second features associated with the road may include one or more attributes of a road element.

In some embodiments, the one or more second features may include a calculated size of the road element. And determining the second pose of the subject at the second time point at least based on comparing the one or more first features associated with the road with the one or more second features associated with the road may include obtaining a reference size of the road element, and determining the second pose of the subject at the second time point based on the calculated size of the road element and the reference size of the road element.

In some embodiments, determining the second pose of the subject at the second time point at least based on comparing the one or more first features associated with the road with the one or more second features associated with the road may include aligning the one or more first features with the one or more second features to generate at least one pair of aligned features, and determining the second pose of the subject according to a cost function. A cost measure of the cost function may include a distance error between the at least one pair of aligned features.

In some embodiments, the at least one pair of aligned features may include a first aligned feature and a second aligned feature, and the distance error between the at least one pair of aligned features may include a difference between a first position corresponding to the first aligned feature and a second position corresponding to the second aligned feature.

In some embodiments, the database may include a pre-built map.

According to an aspect of the present disclosure, a method implemented on a computing device having at least one storage medium and at least one processor is provided. The method may include obtaining a first pose of a subject at a first time point. The method may further include retrieving one or more first features associated with a road from a database. The first road may be viewable by the subject at the first pose and at the first time point. The method may further include obtaining an image captured by the subject at a second time point. The method may further include extracting one or more second features associated with the road from the image. And the method may also include determining a second pose of the subject at the second time point at least based on comparing the one or more first features associated with the road with the one or more second features associated with the road.

According to an aspect of the present disclosure, a positioning method is provided. The method may include obtaining a pose of a positioning device at a first time point and an image captured at a second time point. The method may further include obtaining one or more attributes of a first road element within a viewing angle range of the image from a pre-built map database based on the pose of the positioning device at the first time point. The method may further include extracting one or more attributes of a second road element from the image captured at the second time point. And the method may also include determining a pose of the positioning device at the second time point based on comparing the one or more attributes of the first road element with the one or more attributes of the second road element.

In some embodiments, the method may further include determining that the image captured at the second time point is a key frame.

In some embodiments, the determining that the image captured at the second time point is a key frame may include determining the image captured at the second time point as the key frame on occurrence that a moving distance of the positioning device from the first time point to the second time point acquired by an inertial measurement unit of the positioning device is larger than or equal to a first threshold, or a number of matched pixels between an image captured at the first time point and the image captured at the second time point is smaller than or equal to a second threshold.

In some embodiments, the determining of the pose of the positioning device at the second time point based on comparing the one or more attributes of the first road element with the one or more attributes of the second road element may include determining the pose of the positioning device at the second time point based on a three-dimensional coordinate of the first road element and a two-dimensional coordinate of the second road element in the image, when the one or more attributes of the first road element are consistent with the one or more attributes of the second road element.

In some embodiments, the method may further include obtaining a geographic location of the positioning device at the second time point. The determining of the pose of the positioning device at the second time point based on the three-dimensional coordinate of the first road element and the two-dimensional coordinate of the second road element in the image may include determining the pose of the positioning device at the second time point based on the geographic location of the positioning device at the second time point, the three-dimensional coordinate of the first road element, and the two-dimensional coordinate of the second road element in the image.

In some embodiments, the method may further include determining a calculated size of the second road element based on the two-dimensional coordinate of the second road element in the image. The determining of the pose of the positioning device at the second time point based on the geographic location of the positioning device at the second time point, the three-dimensional coordinate of the first road element, and the two-dimensional coordinate of the second road element in the image may include determining the pose of the positioning device at the second time point based on a reference size of the second road element, the calculated size of the second road element, the geographic location of the positioning device at the second time point, the three-dimensional coordinate of the first road element, and the two-dimensional coordinate of the second road element in the image.

In some embodiments, the pre-built map database may be a high precision map database.

In some embodiments, the one or more attributes of the first road element or the one or more attributes of the second road element may include a type, a color, a scale, or a relative location relationship of the first road element or second road element.

In some embodiments, the method may further include outputting the pose of the positioning device at the second time point.

According to an aspect of the present disclosure, a positioning apparatus is provided. The apparatus may include an obtaining module configured to obtain a pose of a positioning device at a first time point and an image captured at a second time point. The apparatus may further include a retrieving module configured to obtain one or more attributes of a first road element within a viewing angle range of the image from a pre-built map database based on the pose of the positioning device at the first time point. The apparatus may further include an extraction module configured to extract one or more attributes of a second road element from the image captured at the second time point. And the apparatus may also include a pose determination module configured to determine a pose of the positioning device at the second time point based on comparing the one or more attributes of the first road element with the one or more attributes of a second road element.

In some embodiments, the pose determination module may be configured to determine that the image captured at the second time point is a key frame.

In some embodiments, the pose determination module may be further configured to determine that the image captured at the second time point is the key frame on occurrence that a moving distance of the positioning device from the first time point to the second time point acquired by an inertial measurement unit of the positioning device is larger than or equal to a first threshold, or a number of matched pixels between an image captured at the first time point and the image captured at the second time point is smaller than or equal to a second threshold.

In some embodiments, the pose determination module may be configured to determine the pose of the positioning device at the second time point based on a three-dimensional coordinate of the first road element and a two-dimensional coordinate of the second road element in the image, when the one or more attributes of the first road element are consistent with the one or more attributes of the second road element.

In some embodiments, the obtaining module may be further configured to obtain a geographic location of the positioning device at the second time point. The pose determination module may be further configured to determine the pose of the positioning device at the second time point based on the geographic location of the positioning device at the second time point, the three-dimensional coordinate of the first road element, and the two-dimensional coordinate of the second road element in the image.

In some embodiments, the pose determination module may be configured to determine a calculated size of the second road element based on the two-dimensional coordinate of the second road element in the image. And the pose determination module may be further configured to determine the pose of the positioning device at the second time point based on a reference size of the second road element, the calculated size of the second road element, the geographic location of the positioning device at the second time point, the three-dimensional coordinate of the first road element, and the two-dimensional coordinate of the second road element in the image.

In some embodiments, the pre-built map database may be a high precision map database.

In some embodiments, the one or more attributes of the first road element or the one or more attributes of the second road element may include a type, a color, a scale, or a relative location relationship of the first road element or the second road element.

In some embodiments, the pose determination module may be configured to output the pose of the positioning device at the second time point.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
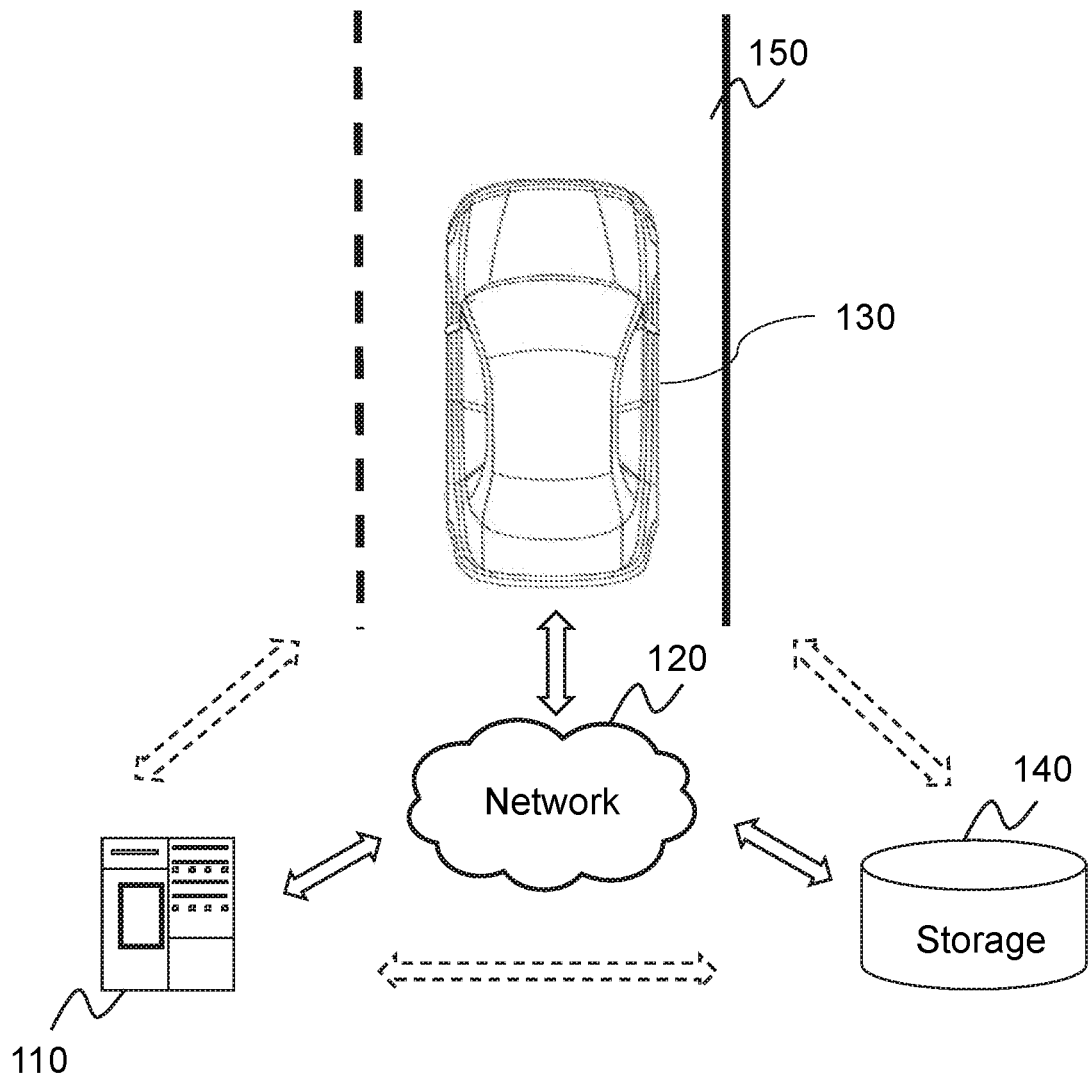
FIG. 1 is a schematic diagram illustrating an exemplary autonomous driving system according to some embodiments of the present disclosure.

The following description is presented to enable any person skilled in the art to make and use the present disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise.

It will be further understood that the terms "comprise," "comprises," and/or "comprising," "include," "includes," and/or "including," when used in this disclosure, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operations and functions of the related elements of structure and the combination of parts and economies of manufacture, may become more apparent upon consideration of the following description with reference to the accompanying drawings, all of which form part of this disclosure. It is to be expressly understood, however, that the drawings are for the purpose of illustration and description only and are not intended to limit the scope of the present disclosure. It is understood that the drawings are not to scale.

The flowcharts used in the present disclosure illustrate operations that systems implement according to some embodiments of the present disclosure. It is to be expressly understood, the operations of the flowcharts may be implemented not in order. Conversely, the operations may be implemented in inverted order, or simultaneously. Moreover, one or more other operations may be added to the flowcharts. One or more operations may be removed from the flowcharts.

Moreover, while the systems and methods disclosed in the present disclosure are described primarily regarding a transportation system in land, it should be understood that this is only one exemplary embodiment. The systems and methods of the present disclosure may be applied to any other kind of transportation system. For example, the systems and methods of the present disclosure may be applied to transportation systems of different environments including ocean, aerospace, or the like, or any combination thereof. The vehicle of the transportation systems may include a car, a bus, a train, a subway, a vessel, an aircraft, a spaceship, a hot-air balloon, or the like, or any combination thereof.

The positioning technology used in the present disclosure may be based on a global positioning system (GPS), a global navigation satellite system (GLONASS), a compass navigation system (COMPASS), a Galileo positioning system, a quasi-zenith satellite system (QZSS), a wireless fidelity (WiFi) positioning technology, a Beidou navigation satellite system (BDS), a GNASS, or the like, or any combination thereof. One or more of the above positioning systems may be used interchangeably in the present disclosure.

An aspect of the present disclosure relates to systems and methods for determining a pose of a subject. In some embodiments, the systems and methods may determine a pose of the subject at a second time point based on a first pose of the subject at a first time point before the second time point, and an image captured by the subject at the second time point. Specifically, the systems and methods may retrieve first features associated with a road from a database based on the first pose of the subject at the first time. For example, the first features associated with the road may be attributes of one or more road elements that is viewable by the subject at the first pose. Further, the systems and methods may extract second features associated with the road from the image. Then, the systems and methods may compare and align the first features with the second features, and determine the pose of the subject at the second time point according a cost function that includes a distance error between the aligned first features and second features. By incorporating the data retrieved from a database (e.g., the first features associated with the road), the systems and methods may achieve a high accuracy in the determination of the pose of the subject.

FIG. 1 is a schematic diagram illustrating an exemplary autonomous driving system according to some embodiments of the present disclosure. It shall be noted that the autonomous driving system described below is merely an exemplary system provided for illustration purpose. Other systems, such as a robotics system, a mobile measurement system, or a system that includes a positioning service, may be similarly implemented with one or more components described below by a person having ordinary skills in the art. In some embodiments, the autonomous driving system 100 may include a computing device 110, a network 120, a vehicle 130, and a storage 140.

In some embodiments, the computing device 110 may be a single server or a server group. The server group may be centralized or distributed (e.g., the computing device 110 may be a distributed system). In some embodiments, the computing device 110 may be local to or remote from other components of the autonomous driving system 100 (e.g., the vehicle 130). For example, the computing device 110 may access information and/or data stored in the vehicle 130 and/or the storage 140 via the network 120. As another example, the computing device 110 may be directly connected to the vehicle 130 and/or the storage 140 to access stored information and/or data. In some embodiments, the computing device 110 may be implemented on a cloud platform or an onboard computer. Merely by way of example, the cloud platform may include a private cloud, a public cloud, a hybrid cloud, a community cloud, a distributed cloud, an inter-cloud, a multi-cloud, or the like, or any combination thereof. In some embodiments, the computing device 110 may be implemented on a computing device 200 including one or more components illustrated in FIG. 2 in the present disclosure.

In some embodiments, the computing device 110 may process information and/or data associated with a road (e.g., the road on which the vehicle 130 is travelling) to perform one or more functions described in the present disclosure. For example, the computing device 110 may retrieve one or more first features associated with a road from a database. Specifically, the road may be viewable by a subject (e.g., a positioning device of the vehicle 130 having the function of imaging) at a first pose and at a first time point. The computing device 110 may search the one or more first features associated with the road in the database according to the first pose of the subject. As another example, the computing device 110 may extract one or more second features associated with the road from an image. The image may be captured by the subject at a second time. Furthermore, the computing device 110 may determine a second pose of the subject at the second time point at least based on comparing the one or more first features associated with the road with the one or more second features associated with the road. As used herein, a pose of the subject may include the position and/or orientation (e.g., Euler angles) of the subject at a specific time point. The feature(s) associated with the road may include the characteristic information, such as the attributes, of one or more road elements. In some embodiments, the computing device 110 may include one or more processing engines (e.g., single-core processing engine(s) or multi-core processor(s)). Merely by way of example, the computing device 110 may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof.

In some embodiments, the computing device 110 may be connected to the network 120 to communicate with one or more components (e.g., the vehicle 130, the storage 140) of the autonomous driving system 100. In some embodiments, the computing device 110 may be directly connected to or communicate with one or more components (e.g., the vehicle 130, the storage 140) of the autonomous driving system 100. In some embodiments, the computing device 110 may be integrated in the vehicle 130. For example, the computing device 110 may be a computing device (e.g., an on-board computer) installed in the vehicle 130.

The network 120 may facilitate exchange of information and/or data. In some embodiments, one or more components (e.g., the computing device 110, the vehicle 130, or the storage 140) of the autonomous driving system 100 may send information and/or data to other component(s) of the autonomous driving system 100 via the network 120. For example, the computing device 110 may retrieve one or more features associated with a road from a database via the network 120. In some embodiments, the network 120 may be any type of wired or wireless network, or combination thereof. Merely by way of example, the network 120 may include a cable network, a wireline network, an optical fiber network, a tele communications network, an intranet, an Internet, a local area network (LAN), a wide area network (WAN), a wireless local area network (WLAN), a metropolitan area network (MAN), a public telephone switched network (PSTN), a Bluetooth network, a ZigBee network, a near field communication (NFC) network, or the like, or any combination thereof. In some embodiments, the network 120 may include one or more network access points. For example, the network 120 may include wired or wireless network access points, through which one or more components of the autonomous driving system 100 may be connected to the network 120 to exchange data and/or information.

The vehicle 130 may be capable of sensing environmental information and navigating with or without human maneuvering. In some embodiments, the vehicle 130 may include structures of a conventional vehicle. For example, the vehicle 130 may include a plurality of control components configured to control operations of the vehicle 130. The plurality of control components may include a steering device (e.g., a steering wheel), a brake device (e.g., a brake pedal), an accelerator, etc. The steering device may be configured to adjust a heading and/or a direction of the vehicle 130. The brake device may be configured to perform a braking operation to stop the vehicle 130. The accelerator may be configured to control a velocity and/or an acceleration of the vehicle 130.

The vehicle 130 may also include a positioning device containing a plurality of detection units configured to detect surrounding environment (e.g., road information) associated with the vehicle 130 when the vehicle 130 is traveling on the lane 150. The plurality of detection units may include a camera, a global position system (GPS) module, an inertial measurement unit (IMU), an acceleration sensor (e.g., a piezoelectric sensor), a velocity sensor (e.g., a Hall sensor), a distance sensor (e.g., a radar, a LIDAR, an infrared sensor), a steering angle sensor (e.g., a tilt sensor), a traction-related sensor (e.g., a force sensor), etc. In some embodiments, the road information associated with the vehicle 130 may include the characteristic information of one or more road elements detected by the positioning device of the vehicle 130.

The storage 140 may store data and/or instructions. In some embodiments, the storage 140 may store data obtained from the vehicle 130, such as road information associated with the vehicle 130 acquired by the positioning device. In some embodiments, the storage 140 may include a database that can provide characteristic information associated with a road. In some embodiments, the storage 140 may store data and/or instructions that the computing device 110 may execute or use to perform exemplary methods described in the present disclosure. In some embodiments, the storage 140 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyrisor RAM (T-RAM), and a zero-capacitor RAM (Z-RAM), etc. Exemplary ROM may include a mask ROM (MROM), a programmable ROM (PROM), an erasable programmable ROM (EPROM), an electrically-erasable programmable ROM (EEPROM), a compact disk ROM (CD-ROM), and a digital versatile disk ROM, etc. In some embodiments, the storage 140 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage 140 may be connected to the network 120 to communicate with one or more components (e.g., the computing device 110, the vehicle 130) of the autonomous driving system 100. One or more components of the autonomous driving system 100 may access the data or instructions stored in the storage 140 via the network 120. In some embodiments, the storage 140 may be directly connected to or communicate with one or more components (e.g., the computing device 110, the vehicle 130) of the autonomous driving system 100. In some embodiments, the storage 140 may be part of the computing device 110. In some embodiments, the storage 140 may be integrated in the vehicle 130.

It should be noted that the autonomous driving system 100 is merely provided for the purposes of illustration, and is not intended to limit the scope of the present disclosure. For persons having ordinary skills in the art, multiple variations or modifications may be made under the teachings of the present disclosure. For example, the autonomous driving system 100 may further include a database, an information source, etc. As another example, the autonomous driving system 100 may be implemented on other devices to realize similar or different functions. However, those variations and modifications do not depart from the scope of the present disclosure.

Figure 2:
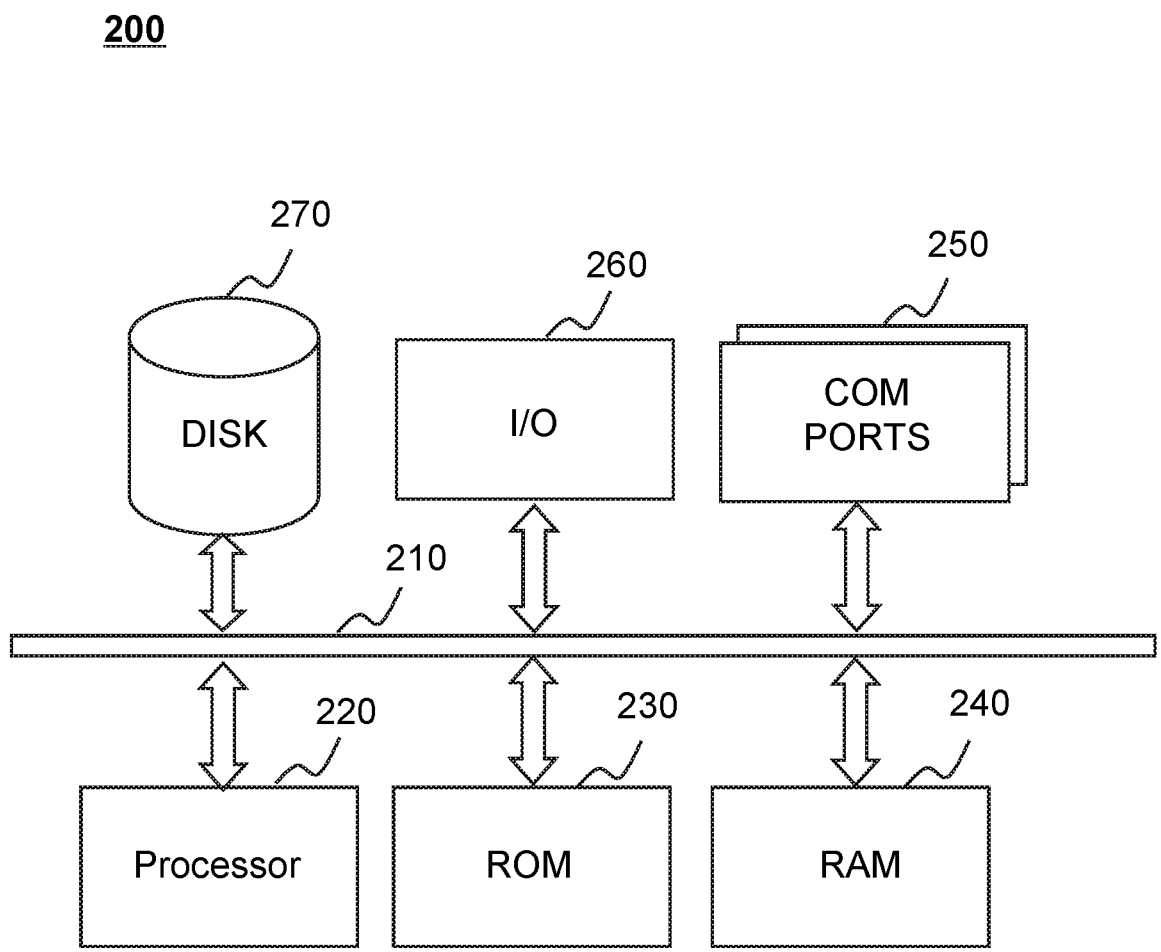
FIG. 2 is a schematic diagram illustrating exemplary hardware and/or software components of an exemplary computing device according to some embodiments of the present disclosure.

FIG. 2 is a schematic diagram illustrating exemplary hardware and/or software components of an exemplary computing device according to some embodiments of the present disclosure. In some embodiments, the computing device 110 may be implemented on the computing device 200. For example, the computing device 110 may be implemented on the computing device 200 and configured to perform functions of the computing device 110 disclosed in this disclosure.

The computing device 200 may be used to implement any component of the autonomous driving system 100 of the present disclosure. For example, the computing device 110 of the autonomous driving system 100 may be implemented on the computing device 200, via its hardware, software program, firmware, or a combination thereof. Although only one such computer is shown for convenience, the computer functions associated with the autonomous driving system 100 as described herein may be implemented in a distributed manner on a number of similar platforms to distribute the processing load.

The computing device 200, for example, may include communication (COMM) ports 250 connected to and from a network (e.g., the network 120) connected thereto to facilitate data communications. The computing device 200 may also include a processor (e.g., a processor 220), in the form of one or more processors (e.g., logic circuits), for executing program instructions. For example, the processor may include interface circuits and processing circuits therein. The interface circuits may be configured to receive electronic signals from a bus 210, wherein the electronic signals encode structured data and/or instructions for the processing circuits to process. The processing circuits may conduct logic calculations, and then determine a conclusion, a result, and/or an instruction encoded as electronic signals. Then the interface circuits may send out the electronic signals from the processing circuits via the bus 210.

The computing device 200 may further include program storage and data storage of different forms, for example, a disk 270, and a read only memory (ROM) 230, or a random access memory (RAM) 240, for storing various data files to be processed and/or transmitted by the computing device 200. The computing device 200 may also include program instructions stored in the ROM 230, the RAM 240, and/or other type of non-transitory storage medium to be executed by the processor 220. The methods and/or processes of the present disclosure may be implemented as the program instructions. The computing device 200 also includes an I/O component 260, supporting input/output between the computing device 200 and other components therein. The computing device 200 may also receive programming and data via network communications.

Merely for illustration, only one processor is described in the computing device 200. However, it should be noted that the computing device 200 in the present disclosure may also include multiple processors, and thus operations that are performed by one processor as described in the present disclosure may also be jointly or separately performed by the multiple processors. For example, the processor of the computing device 200 executes both operation A and operation B. As in another example, operation A and operation B may also be performed by two different processors jointly or separately in the computing device 200 (e.g., the first processor executes operation A and the second processor executes operation B, or the first and second processors jointly execute operations A and B).

Figure 3:
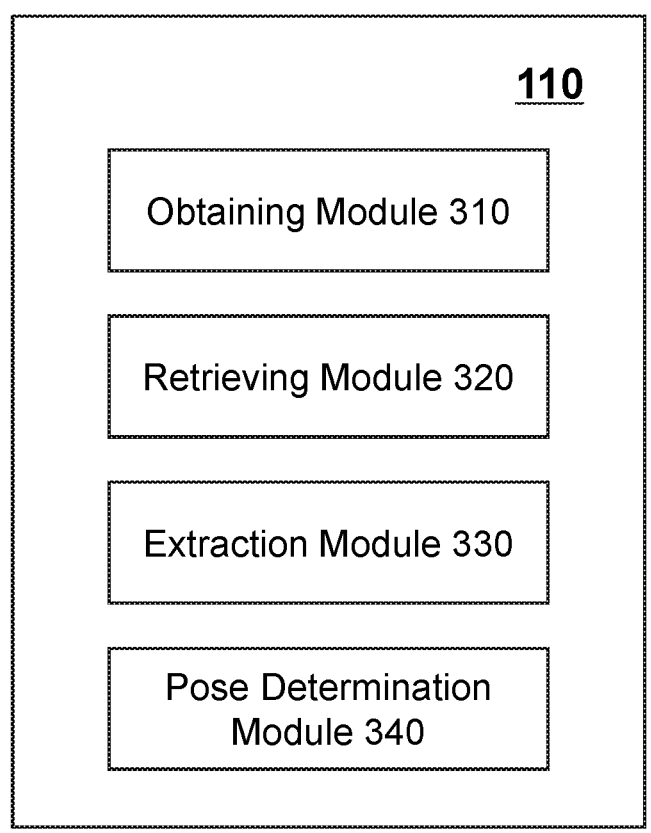
FIG. 3 is a block diagram illustrating an exemplary computing device according to some embodiments of the present disclosure.

FIG. 3 is a block diagram illustrating an exemplary processing engine according to some embodiments of the present disclosure. The computing device 110 may include an obtaining module 310, a retrieving module 320, an extraction module 330, and a pose determination module 340.

The obtaining module 310 may be configured to obtain a first pose of the subject at a first time point. In some embodiments, the first pose of the subject at the first time point may be a pose of the subject at the time point when the subject is working (e.g., when the vehicle carrying the subject is working in an autonomous mode). Alternatively or additionally, the first pose of the subject at the first time point may be a pose of the subject when a predetermined condition occurs. An exemplary detailed descriptions regarding the determination of the first pose of the subject at the first time point may be found elsewhere in the present disclosure. See, FIG. 6 and the relevant descriptions thereof.

The obtaining module 310 may also be configured to obtain an image captured by the subject at a second time point. The second time point may be after the first time point. The image may include the surrounding environment that is in the viewing angle range of the camera in the subject. The image captured by the subject may include an RGB image, a grayscale image, a depth image, a cloud of points, etc. In some embodiments, the image captured by the subject may also include a time stamp to provide the time information associated with the image. In some embodiments, an image captured by the subject at a time point may also be referred to as an image frame.

The retrieving module 320 may be configured to retrieve one or more first features associated with a road from a database. The road may be viewable by the subject at the first pose and at the first time point. In some embodiments, one or more road elements within a viewing angle range of the subject may be viewable by the subject at the first pose and at the first time point. The one or more first features associated with the road may include one or more attributes of each of the one or more road elements. An attribute of a road element may include a type (e.g., a traffic sign, a traffic light, a road sign, a lane line, a signage) of the road element, a color of the road element, geometrical information (e.g., a shape, a size, a scale) of the road element, geographic location information (e.g., a longitude, a latitude, and a height in the geographic coordinate system) of the road element, a relative position (e.g., with respect to other road elements) of the one or more road elements, or the like, or any combination thereof.

The retrieving module 320 may also be configured to retrieve one or more third features associated with a road from a database based on the preliminary pose of the subject. In some embodiments, the one or more third features associated with the road may include one or more attributes of one or more road elements viewed by the subject at the preliminary pose. Relevant descriptions may be found elsewhere in the present disclosure, e.g., FIG. 4A, FIG. 5, and the descriptions thereof.

The extraction module 330 may be configured to extract one or more second features associated with the road from the image. The road in the image captured at the second time point may also include one or more road elements. The one or more second features associated with the road may include one or more attributes of each of the one or more road elements in the image captured at the second time point. The computing device 110 may employ various techniques to extract the one or more second features associated with the road from the image. In some embodiments, at least some of the second features associated with the road may be same as or similar to one or more first features associated with the road described above.

The extraction module 330 may also be configured to extract one or more fourth features associated with the road from the image. The one or more fourth features associated with the road may include one or more attributes of the one or more road elements in the image. The fourth features may be similar to the first/second features, and relevant descriptions may be found elsewhere in the present disclosure, e.g., FIG. 4A and descriptions thereof.

The pose determination module 340 may be configured to determine a second pose of the subject at the second time point at least based on comparing the one or more first features associated with the road with the one or more second features associated with the road. In some embodiments, the comparison between the first features and the second features may include a match/alignment operation that generates a matched/aligned result between the first features and the second features. In some embodiments, by matching the first features associated with the road with the second features associated with the road, the pose determination module 340 may establish a correspondence relationship between one or more specific first features and corresponding specific second features (also referred to as a 3D-2D relationship).

In some embodiments, to determine the second pose of the subject at the second time point at least based on comparing the one or more first features associated with the road with the one or more second features associated with the road, the pose determination module 340 may be configured to determine whether the image captured by the subject at the second time point is a key frame. In response to a determination that the image captured by the subject at the second time point is a key frame, the pose determination module 340 may be configured to align the one or more first features with the one or more second features to generate at least one pair of aligned features. The at least one pair of aligned features may include a first aligned feature and a second aligned feature. And the pose determination module 340 may be further configured to determine the second pose of the subject according to a cost function. A cost measure of the cost function may include a distance error between the at least one pair of aligned features.

The modules in the computing device 110 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Any two of the modules may be combined as a single module, any one of the modules may be divided into two or more units.

For example, the obtaining module 310 and the extraction module 330 may be combined as a single module which may both receive the detection information associated with the plurality of traffic objects and extract feature values of a plurality of features of each traffic object.

Figure 4A:
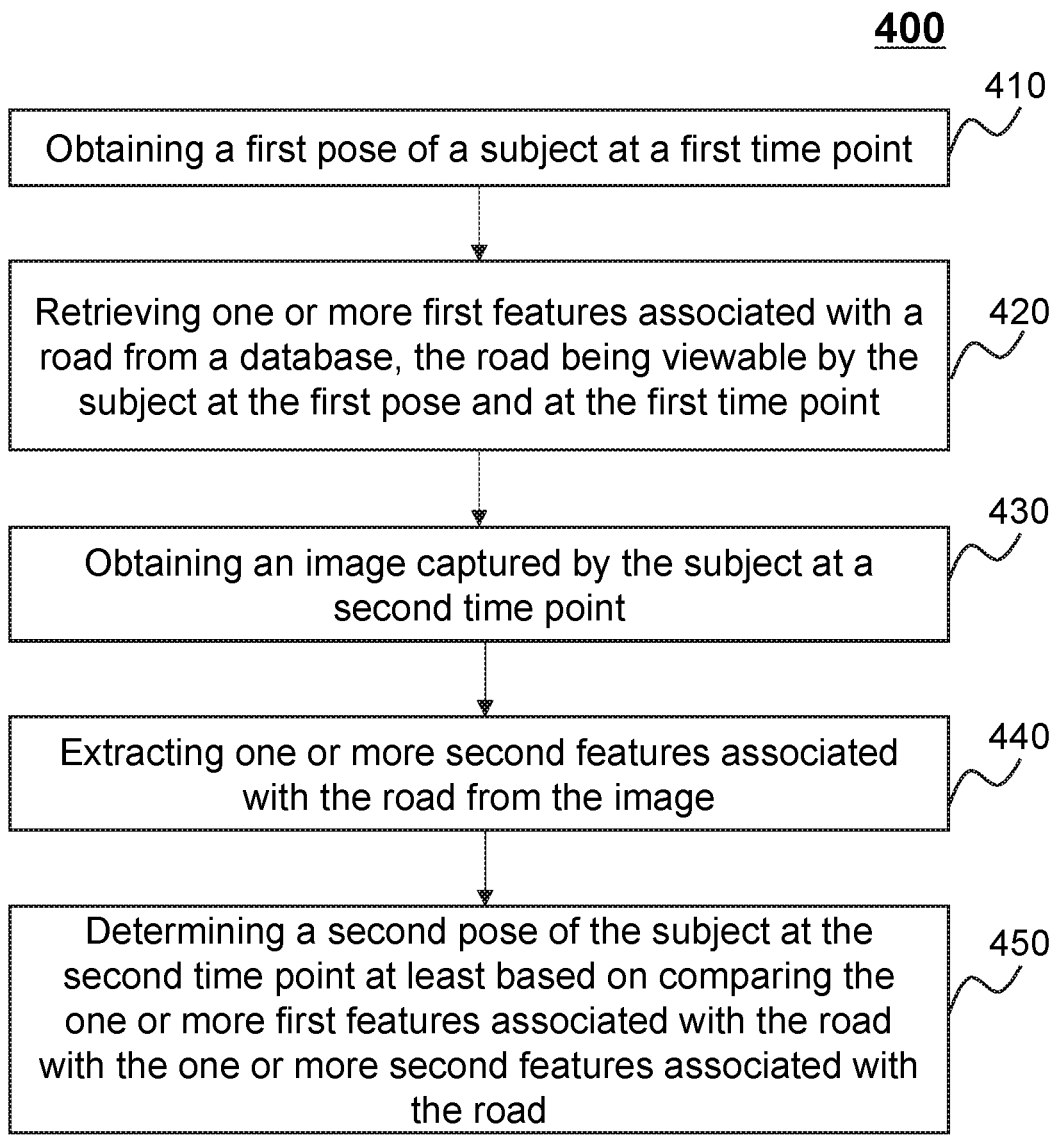
FIG. 4A is a flowchart illustrating an exemplary process for determining a pose of a subject according to some embodiments of the present disclosure.

FIG. 4A is a flowchart illustrating an exemplary process for determining a pose of a subject according to some embodiments of the present disclosure. The process 400 may be executed by the autonomous driving system 100. For example, the process 400 may be implemented as a set of instructions stored in the storage ROM 230 or RAM 240. The processor 220 and/or the modules in FIG. 3 may execute the set of instructions, and when executing the instructions, the processor 220 and/or the modules may be configured to perform the process 400. The operations of the illustrated process presented below are intended to be illustrative. In some embodiments, the process 400 may be accomplished with one or more additional operations not described and/or without one or more of the operations discussed. Additionally, the order in which the operations of the process 400 illustrated in FIG. 4A and described below is not intended to be limiting.

As used herein, the subject may refer to any composition of organic and/or inorganic matters that are with or without life and located on earth. In certain embodiments, the subject may be a positioning device in a vehicle (e.g., the vehicle 130) as described elsewhere in the present disclosure (e.g., FIG. 1 and the relevant descriptions). To better achieve the function of positioning, in some embodiments, the subject may also include one or more sensors, such as, a monocular camera, a binocular camera, a depth camera, an IMU, a GPS, or the like, or any combination thereof. In some embodiments, the subject may be mounted in any suitable position in the vehicle (e.g., on the top of the vehicle 130, at the front end of the vehicle 130). When the relative position between the subject and the vehicle is fixed, the pose of the vehicle (e.g., the position or orientation of the vehicle) may be reflected by the pose of the subject. In some embodiments, the pose of the subject, including the position and/or the orientation of the subject, may be described in connection with a coordinate system. The coordinate system may be any suitable coordinate system with a fixed origin and/or one or more fixed axes, such as a geographic coordinate system. The coordinate system may have any number (or count) of dimensions. For example, the coordinate system may be a two-dimensional (2D) or a three-dimensional (3D) coordinate system.

In some embodiments, the position of the subject in the coordinate system may be represented by a coordinate in the coordinate system. The orientation of the subject may be represented by one or more Euler angles in the coordinate system. Taking a 3D coordinate system having an X-axis, a Y-axis, and a Z-axis as an example, the position of the subject in the 3D coordinate system may be represented by one or more of an X-coordinate on the X-axis, a Y-coordinate on the Y-axis, and a Z-coordinate on the Z-axis. The orientation of the subject with respect to the 3D coordinate system may be represented by one or more of a yaw angle $\alpha$, a pitch angle $\beta$, and/or a roll angle $\gamma$. Under this situation, the pose P of the subject at a time point t may be expressed as $P_t=[X_t,Y_t,Z_t,\alpha_t,\beta_t,\gamma_t]$.

In some embodiments, the vehicle (e.g., the vehicle 130) may be located in a surrounding environment. The surrounding environment of the vehicle may include one or more objects (including living and non-living objects) surrounding the vehicle. At least part of the surrounding environment is within a viewing angle range of the subject (e.g., the positioning device of the vehicle 130) and may be viewable by the subject. In some embodiments, the maximum viewing angle range of the subject may be similar to or same as the viewing angle range of the camera in the subject. In the condition that the subject may include more than one camera, the maximum viewing angle range may be an overlap of the respective viewing angle range for each camera. In some embodiments, the viewing angle range of the subject may be reflected by the filed of view presented in an image captured by the subject. In some embodiments, the maximum viewing angle range of the subject may be determined by a user according to actual needs. For example, the objects within a preset distance (e.g., 50 meters) from the position of the subject and in front of the subject may be regarded as being within the range of viewing angle of the subject.

Particularly, in certain embodiments, the vehicle (e.g., the vehicle 130) may be travelling on a road (e.g., the lane 150 as shown in FIG. 1). The road may include one or more road elements (e.g., a land line, a road sign, a traffic sign, a traffic light, a signage, a curb, a road lamp) that can be viewed by the subject and used to identify the specific locations of the road. The computing device 110 may perform the process 400 to determine the pose of the subject by analyzing characteristic information of the one or more road elements that can be viewed by the subject.

In 410, the computing device 110 (e.g., the obtaining module 310) may obtain a first pose of the subject at a first time point. In some embodiments, the first pose of the subject at the first time point may be a pose of the subject at the time point when the subject is working (e.g., when the vehicle carrying the subject is working in an autonomous mode). Alternatively or additionally, the first pose of the subject at the first time point may be a pose of the subject when a predetermined condition occurs. Exemplary predetermined conditions may include an initialization of the subject, a failure of one or more components of the vehicle, a deviation of the vehicle from a route, a detection of a user command, or the like, or a combination thereof. An exemplary detailed descriptions regarding the determination of the first pose of the subject at the first time point may be found elsewhere in the present disclosure. See, FIG. 6 and the relevant descriptions thereof.

In 420, the computing device 110 (e.g., the retrieving module 320) may retrieve one or more first features associated with a road from a database. The road may be viewable by the subject at the first pose and at the first time point. As described above, one or more road elements within a viewing angle range of the subject may be viewable by the subject at the first pose and at the first time point. The one or more first features associated with the road may include one or more attributes of each of the one or more road elements. An attribute of a road element may include a type (e.g., a traffic sign, a traffic light, a road sign, a lane line, a signage) of the road element, a color of the road element, geometrical information (e.g., a shape, a size, a scale) of the road element, geographic location information (e.g., a longitude, a latitude, and a height in the geographic coordinate system) of the road element, a relative position (e.g., with respect to other road elements) of the one or more road elements, or the like, or any combination thereof.

Figure 5:
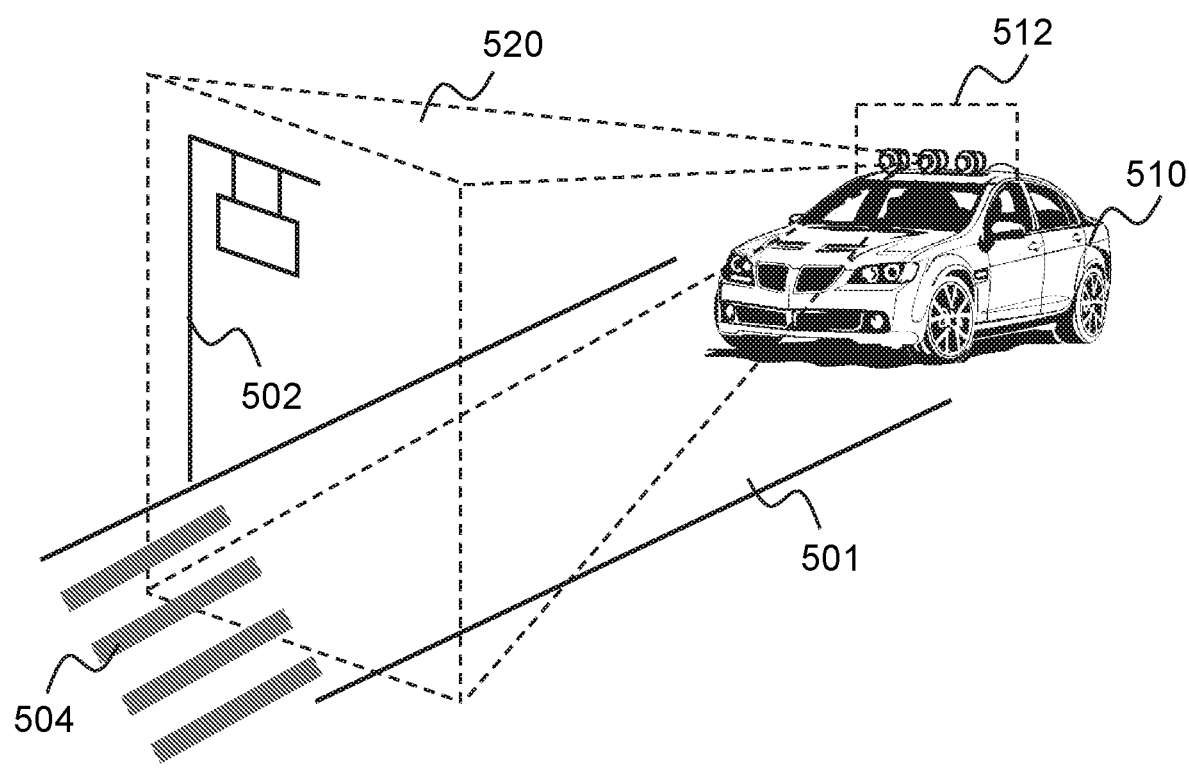
FIG. 5 is a schematic diagram illustrating exemplary road elements viewed by a subject at a pose according to some embodiments of the present disclosure.

Referring to FIG. 5, a vehicle 510 with a positioning device 512 traveling on a road 501 is illustrated as an example. The positioning device 512 may have a plurality of detection units. A quadrangular prism shaped area 520 may represent a viewable area of the positioning device 512 of the vehicle 510. As described above, the range of the quadrangular prism shaped area 520 may be determined based on the performance of the positioning device 512 (e.g., the viewing angle range of one or more cameras in the positioning device 512), or may be preset by a user. At the pose of the positioning device 512, the road elements viewed by the positioning device 512 may include any road element located in the quadrangular prism shaped area 520. As shown in the figure, the road elements located in the quadrangular prism shaped area 520 may include a road sign 502 and a portion of crosswalk 504. Merely by way of example, the attribute of the road sign 502 may include the type (i.e., a road sign other than a traffic sign) of the road sign 502, the color (e.g., blue and white) of the road sign 502, the geometrical information (e.g., a rectangle) of the road sign 502, the geographic location information (e.g., the longitude, latitude, and/or height in the geographic coordinate system) of the road sign 502, the relative position (e.g., on the right side of the road) of the road sign 502, etc. The attribute of the portion of crosswalk 504 may include the type (i.e., a traffic sign other than a road sign) of the portion of crosswalk 504, the color (e.g., white) of the portion of crosswalk 504, the geometrical information (e.g., multiple stripes) of the portion of crosswalk 504, the geographic location information (e.g., the longitude, latitude, and/or height in the geographic coordinate system) of the portion of crosswalk 504, the relative position (e.g., in the center of the road) of the crosswalk 504, etc.

The database may be any 3D location information database that includes the attribute information of one or more road elements of a road. In some embodiments, the database may be a pre-built map database, e.g., a high definition map database. The pre-built map database may include multidimensional information of a specific region (e.g., a city). The multidimensional information of the specific region may include, for example, the position information of one or more objects (e.g., a road, a road element, an architecture, a landmark) in the region, the attribute information of the one or more objects, or the like, or a combination thereof. In some embodiments, the pre-built map database may be loaded to the autonomous driving system 100 (e.g., to the computing device 110 or the storage 140) in advance, and act as a local database in the autonomous driving system 100. For example, the uploaded pre-built map database may be stored in the storage 140, the ROM 230, and/or the RAM 240. Additionally or alternatively, the pre-built map database may be a remote database, such as a cloud database, which can be accessed by the computing device 110 via the network 120.

If the pre-built map database is a remote database, the computing device 110 may transmit a request to the pre-built map database via the network 120. The request may at least include the first pose of the subject at the first time point. In response to the request, the pre-built map database may transmit the one or more first features associated with the road being viewable by the subject at the first pose accordingly.

In some embodiments, the pre-built map database may store attribute information of all the road elements of the road. Merely by way of example, the pre-built map database may be generated based on data acquired by a mobile measurement system (e.g., including one or more road information acquisition vehicle) in advance. In the mobile measurement system, a road information acquisition vehicle may be used for data acquisition. For example, the road information acquisition vehicle may be equipped with a GPS system (or an INS system), a laser device, an IMU, or a camera. When the road information acquisition vehicle is traveling on the road, the camera may capture an image in real time, and the laser device may acquire a point cloud synchronizing with the image captured by the camera. The point cloud acquired by the laser device and the image captured by the camera in real time may be located in two different coordinate systems. The relationship between the two different coordinate systems may be measured by the relative position between the camera and the laser device, which may be obtained by acquiring data of a fixed scene.

Then, a processing device (similar to the computing device 110 of the autonomous system 110) of the mobile measurement system may transform the coordinate system of the point cloud acquired by the laser device and the coordinate system of the image captured by the camera in real time into a uniform coordinate system. For example, the processing device of the mobile measurement system may convert the point cloud acquired by the laser device and the image captured by the camera in real time into the geographic coordinate system based on the real-time pose of the road information acquisition vehicle. In some embodiments, the real-time pose of the road information acquisition vehicle may be determined according to the data collected by the GPS and the IMU, respectively. The processing device of the mobile measurement system may, according to the combined adjustment principle, optimize the pose accuracy by combining the point cloud data, the real-time pose of the road information acquisition vehicle based on the GPS data, and the real-time pose of the road information acquisition vehicle based on the IMU data. The processing device of the road information acquisition vehicle may also extract one or more road elements by combining intensity information of the point cloud acquired by the laser device and color information of the image captured by the camera. At the same time, according to the spatial relationship of the road elements (e.g., the lane lines on the road), the processing device of the mobile measurement system may establish the connection relationship between the road elements (e.g., the lane lines). The processing device of the mobile measurement system may also recognize information (e.g., texture, characters, signs) of each of the road elements from the image captured by the camera and use those information as the attribute of the road elements of the road. Then, the pre-built map database may be generated.

In 430, the computing device 110 (e.g., the obtaining module 310) may obtain an image captured by the subject at a second time point. The second time point may be after the first time point, and the time interval between the first time point and the second time point may be denoted as $\Delta t$. The image may include the surrounding environment that is in the viewing angle range of the camera in the subject. The image captured by the subject may include an RGB image, a grayscale image, a depth image, a cloud of points, etc. In some embodiments, the image captured by the subject may also include a time stamp to provide the time information associated with the image. In some embodiments, an image captured by the subject at a time point may also be referred to as an image frame.

In 440, the computing device 110 (e.g., the extraction module 330) may extract one or more second features associated with the road from the image. The road in the image captured at the second time point may also include one or more road elements. The one or more second features associated with the road may include one or more attributes of each of the one or more road elements in the image captured at the second time point. The computing device 110 may employ various techniques to extract the one or more second features associated with the road from the image. Exemplary techniques may include an image recognition technique, a semantic segmentation technique, a machine learning technique, etc. In some embodiments, at least some of the second features associated with the road may be same as or similar to one or more first features associated with the road described above.

In 450, the computing device 110 (e.g., the pose determination module 340) may determine a second pose of the subject at the second time point at least based on comparing the one or more first features associated with the road with the one or more second features associated with the road. In some embodiments, the comparison between the first features and the second features may include a match/alignment operation that generates a matched/aligned result between the first features and the second features. In some embodiments, by matching the first features associated with the road with the second features associated with the road, the computing device 110 may establish a correspondence relationship between one or more specific first features and corresponding specific second features (also referred to as a 3D-2D relationship). For example, if a certain first feature and a certain second feature both represent a same attribute of a same road element, the certain first feature may be regarded as corresponding to the certain second feature. Correspondingly, a correspondence relationship between the 3D coordinates of the one or more road elements in the pre-built map database that corresponds to the specific first features and the 2D coordinates of the one or more road elements in the image that corresponds to the specific second features may be generated. For example, The 3D-2D relationship may be expressed as below:

$$m_{2d} = F(P_i, X_{3D}),\qquad(1)$$

where $F(P_i, X_{3D})$ represents a perspective projection function, i represents $i^{th}$ image frame (i.e., the image captured by the subject at the second time point), $m_{2d}$ represents 2D coordinates of the one or more road elements in the $i^{th}$ image frame that corresponds to the specific second features, $X_{3D}$ represents 3D coordinates of the one or more road elements in the pre-built map database that corresponds to the specific first features, and $P_i$ represents the pose at which the subject captures the $i^{th}$ image frame.

In some embodiments, the second pose of the subject may be further determined according to the correspondence relationship between the coordinates of the one or more road elements in the pre-built map database that corresponds to the specific first features and the coordinates of the one or more road elements in the image that corresponds to the specific second features based on a cost function. More details about the determination of the second pose of the subject may be found in FIG. 4B.

Figure 4B:
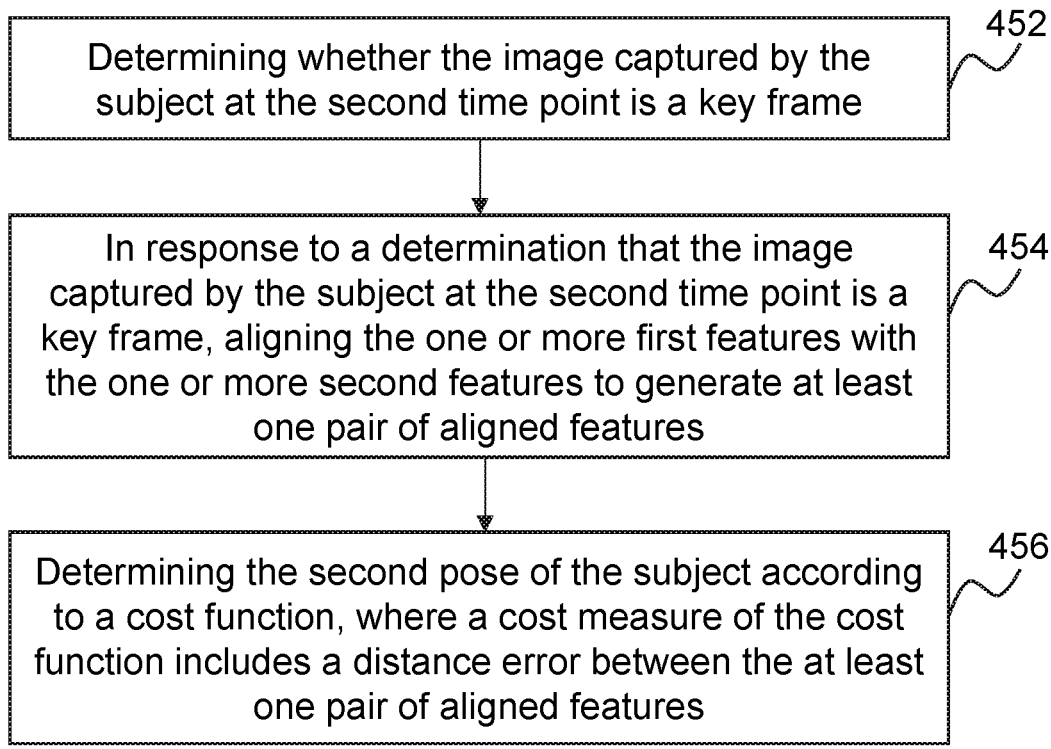
FIG. 4B is a flowchart illustrating an exemplary process for determining a pose of a subject by a cost function according to some embodiments of the present disclosure.

FIG. 4B is a flowchart illustrating an exemplary process 500 for determining the second pose of the subject at the second time according to some embodiments of the present disclosure. In some embodiments, the operation 450 may be performed according to the process 500.

In 452, the computing device 110 (e.g., the pose determination module 340) may determine whether the image captured by the subject at the second time point is a key frame.

In some embodiments, the computing device 110 may determine whether the image captured by the subject at the second time point (also referred to as an $i^{th}$ image frame) is a key frame based on a moving distance of the subject from capturing the image at the first time point (also referred to as an $(i-1)^{th}$ image frame) to capturing the $i^{th}$ image frame. For example, the computing device 110 may determine a first location of the subject at the first time point and a second location of the subject at the second time point based on IMU measurements. The computing device 110 may determine that the image captured by the subject at the second time point (i.e., the $i^{th}$ image frame) is a key frame if a distance between the first location of the subject and the second location of the subject is larger than or equal to a first threshold.

In some embodiments, the computing device 110 may determine whether the image captured by the subject at the second time point (i.e., the $i^{th}$ image frame) is a key frame based on a match score between the $(i-1)^{th}$ image (i.e., an image captured by the subject at a first time point before the second time point) frame and the $i^{th}$ image frame. The match score may be evaluated based on a number (or a count) of matched pixels between the $(i-1)^{th}$ image frame and the $i^{th}$ image frame. The higher the number (or a count) of matched pixels between the $(i-1)^{th}$ image frame and the $i^{th}$ image frame, the higher the match score may be. In some embodiments, the computing device 110 may determine that the image captured by the subject at the second time point is a key frame if the match score between the $(i-1)^{th}$ image frame and the $i^{th}$ image frame is below a second threshold. As used herein, the first threshold and the second threshold may be preset by a user of the autonomous driving system 100.

In 454, in response to a determination that the image captured by the subject at the second time point is a key frame, the computing device 110 (e.g., the pose determination module 340) may align the one or more first features with the one or more second features to generate at least one pair of aligned features. The at least one pair of aligned features may include a first aligned feature and a second aligned feature. The first aligned feature may be a specific first feature that corresponds to a first position of the road element, and the second aligned feature may be a specific second feature that corresponds to a second position of the road element. In some embodiments, a distance error between the at least one pair of aligned features may include a difference between the first position corresponding to the first aligned feature and the second position corresponding to the second aligned feature. In some embodiments, the alignment between the one or more first features and the one or more second features may be generated based on the correspondence relationship between the first features and the second features as described in connection with the operation 450 in FIG. 4A.

In 456, the computing device 110 (e.g., the pose determination module 340) may determine the second pose of the subject according to a cost function. A cost measure of the cost function may include a distance error between the at least one pair of aligned features. For example, the computing device 110 may determine the second pose of the subject according to a cost function in a bundled adjustment (BA) algorithm expressed as below:

$$\arg\min(\Sigma_{i=0}{}^n \Sigma_{j=0}{}^m d(F(P_i, X_j), m_{ij})^2 + d(P_{IMU}, P_i)\\ {}^T W_{IMU} d(P_{IMU}, P_i) + d(T_{gps}, T_i)^T W_{gps} d(T_{gps}, T_i) + d(F\\ (P_i, X_{3D}), m_{2d})^T W_{gps} d(F(P_i, X_{3D}), m_{2d})),\qquad(2)$$

where i represents the image frame i, j represents the jth 3D map point of the image frame i, d represents the difference, $F(P_i, X_j)$ represents the perspective projection function, $P_i$ represents the pose when the subject captures the $i^{th}$ image frame (i.e., the second pose), $X_j$ represents the 3D coordinates of the jth 3D map point, $m_{ij}$ represents the 2D coordinates of the image point in the $i^{th}$ image frame that is aligned with the jth 3D map point, $P_{IMU}$ represents a relative pose measured by the IMU when the subject captures the $i^{th}$ image frame, $W_{IMU}$ represents the weight of the relative pose measured by the IMU, $T_{gps}$ represents the geographic location that GPS acquires when the subject captures the $i^{th}$ image frame, $T_i$ represents the geographical location calculated by the subject, and $W_{gps}$ represents the weight of the geographic location that GPS acquires. In some embodiments, the relative pose $P_{IMU}$ may be obtained based on performing a pre-integration on the IMU measurements. The value of $W_{IMU}$ may relate to the quality of data acquired by the IMU. In some embodiments, the weight $W_{gps}$ may relate to the quality of signals acquired by the GPS. For example, in some occasions, the GPS can hardly acquire the geographic location $T_{gps}$ due to signal blocking, and if so, the weight $W_{gps}$ may be set to be approximate to zero, and thus $d(T_{gps}, T_i)^T W_{gps} d(T_{gps}, T_i)$ of the equation (3) may be ignored or omitted. As described in equation (1), $F(P_i, X_{3D})$ represents a projection of the 3D coordinates $X_{3D}$ of the one or more road elements in the pre-built map database to the 2D coordinates of the one or more road elements in the $i^{th}$ image frame. And accordingly, $d(F(P_i, X_{3D}), m_{2d})$ represents the difference (e.g., a distance error) between the at least one pair of aligned features.

As described in equation (2), the perspective projection function $F(P_i, X_j)$ may denote the projection of the 3D coordinates of the jth 3D map point $X_j$ to the 2D coordinates of the image point in the $i^{th}$ image frame that is aligned with the jth 3D map point. In some embodiments, the perspective projection function $F(P_i, X_j)$ may be determined according to the correspondence relationship between the 3D map points and the 2D coordinates of the image points in the $i^{th}$ image frame, which is described in details below.

Firstly, the computing device 110 may generate a 3D map of the $i^{th}$ image frame. The points in the 3D map (i.e., the 3D map point) may include 3D coordinates of the feature points in the image captured at the second time point (i.e., the $i^{th}$ image frame). For illustration purpose, the 3D coordinates of the feature points in the image may be generated according to a visual Simultaneous Localization and Mapping (SLAM) technique and an image captured by the subject at the first time point (i.e., the $(i-1)^{th}$ image frame).

Then, the computing device 110 may determine one or more visual features (e.g., shape, size, color) for each of the feature points based on the 3D map (e.g., the 3D coordinates of the feature points). Further, the computing device 110 may determine 2D coordinates corresponding to the visual features in the $i^{th}$ image frame (also referred to as projected 2D coordinates) by matching the one or more visual features with the $i^{th}$ image frame. In some embodiments, the computing device 110 may match the one or more visual features of each of the feature points with the $i^{th}$ image frame by a prediction technique. For example, the computing device 110 may determine a preliminary pose $P_i'$ at the second time point according to an equation expressed as below:

$$P_i' = P_{i-1} + V_i * \Delta t, \quad (3)$$

where $P_{i-1}$ represents the pose when the subject captures the $(i-1)^{th}$ image frame, $V_i$ represents the velocity (e.g., linear velocity and angular velocity) of the subject, $\Delta t$ represents the time interval between the capturing of the $(i-1)^{th}$ image frame and the capturing of the $i^{th}$ image frame. According to the preliminary pose $P_i'$, the 3D coordinate of each visual feature may be projected onto the $i^{th}$ image frame based on the 3D-2D relationship, and the projected 2D coordinates corresponding to the visual features may be obtained accordingly.

In some further embodiments, the computing device 110 (e.g., the pose determination module 340) may obtain a reference size of a road element, and determine the second pose of the subject at the second time point based on a calculated size of the road element and the reference size of the road element. The reference size of the road element may be retrieved from the pre-built map database. The calculated size of the road element may be determined according to an equation expressed as below:

$$dis_{prediction} = \|V1 - V2\|, \quad (4)$$

where V1 and V2 are two vertexes of the road element in the $i^{th}$ image frame, $dis_{prediction}$ represents the calculated size of the road element in the $i^{th}$ image frame.

The computing device 110 may determine the second pose of the subject at the second time point based on the calculated size of the road element and the reference size of the road element according to an adjusted cost function as below:

$$\arg\min(\Sigma_{i=0}^n \Sigma_{j=0}^m d(F(P_i, X_j), m_{ij})^2 + d(P_{IMU}, P_i)^T W_{IMU} d(P_{IMU}, P_i)) + d(T_{gps}, T_i)^T W_{gps} d(T_{gps}, T_i)) + d(F(P_i, X_{3D}), m_{2d})^T W_{gps} d(F(P_i, X_{3D}), m_{2d}) + d(dis_{reference}, dis_{prediction})^T W_{size} d(dis_{reference}, dis_{prediction})), \quad (5)$$

where $dis_{reference}$ represents the reference size of the road element in the $i^{th}$ image frame, $dis_{prediction}$ represents the calculated size of the road element in the $i^{th}$ image frame, and $W_{size}$ represents the weight of the size difference. In some embodiments, the GPS can hardly acquire the geographic location $T_{gps}$ due to signal blocking, and if so, the weight $W_{gps}$ may be set to be approximate to zero, and thus the contribution of the term $d(T_{gps}, T_i)^T W_{gps} d(T_{gps}, T_i)$ in equation (5) may be ignored or omitted.

It shall be noted that the difference (e.g., a distance error) between the at least one pair of aligned features in equation (2) may guarantee that the scale error occurred in the combination of the IMU measurements and the SLAM technique, which is also referred to as Visual Inertial Odometry (VIO) technique, can be corrected in determining the second pose. As used herein, the scale error may denote the error caused by the difference between the projected 2D coordinates of the visual features and the 2D coordinates in the image captured at the second time point.

In some embodiments, if the image captured at the second point is not a key image, the term representing the difference (e.g., a distance error) between the at least one pair of aligned features in equation (2) may be removed, and thus the second pose of the subject may be determined according to the following cost function:

$$\arg\min(\Sigma_{i=0}^n \Sigma_{j=0}^m d(F(P_i, X_j), m_{ij})^2 + d(P_{IMU}, P_i)^T W_{IMU} d(P_{IMU}, P_i) + d(T_{gps}, T_i)^T W_{gps} d(T_{gps}, T_i))) \quad (6)$$

Similarly, when taking the reference size and calculated size of a road element into consideration, the second pose of the subject may be determined according to the following cost function:

$$\arg\min(\Sigma_{i=0}^n \Sigma_{j=0}^m d(F(P_i, X_j), m_{ij})^2 + d(P_{IMU}, P_i)^T W_{IMU} d(P_{IMU}, P_i)) + d(T_{gps}, T_i)^T W_{gps} d(T_{gps}, T_i)) + d(dis_{reference}, dis_{prediction})^T W_{size} d(dis_{reference}, dis_{prediction})), \quad (7)$$

In some embodiments, even though the image captured at the second point is a key image, the second pose of the subject may also be determined according to equation (6) or (7).

In some embodiments, the GPS can hardly acquire the geographic location $T_{gps}$ due to signal blocking, and if so, the weight $W_{gps}$ may be set to be approximate to zero, and thus the term $d(T_{gps}, T_i)^T W_{gps} d(T_{gps}, T_i)$ in equation (5) or (6) may be ignored or omitted.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, one or more other optional operations (e.g., a storing operation, outputting the second pose of the subject) may be added elsewhere in the process 400. As another example, the determination of whether the image captured by the subject at the second time point is a key frame may be performed before an operation of the process 400 (e.g., the operation 420, 430, or 440).

Figure 6:
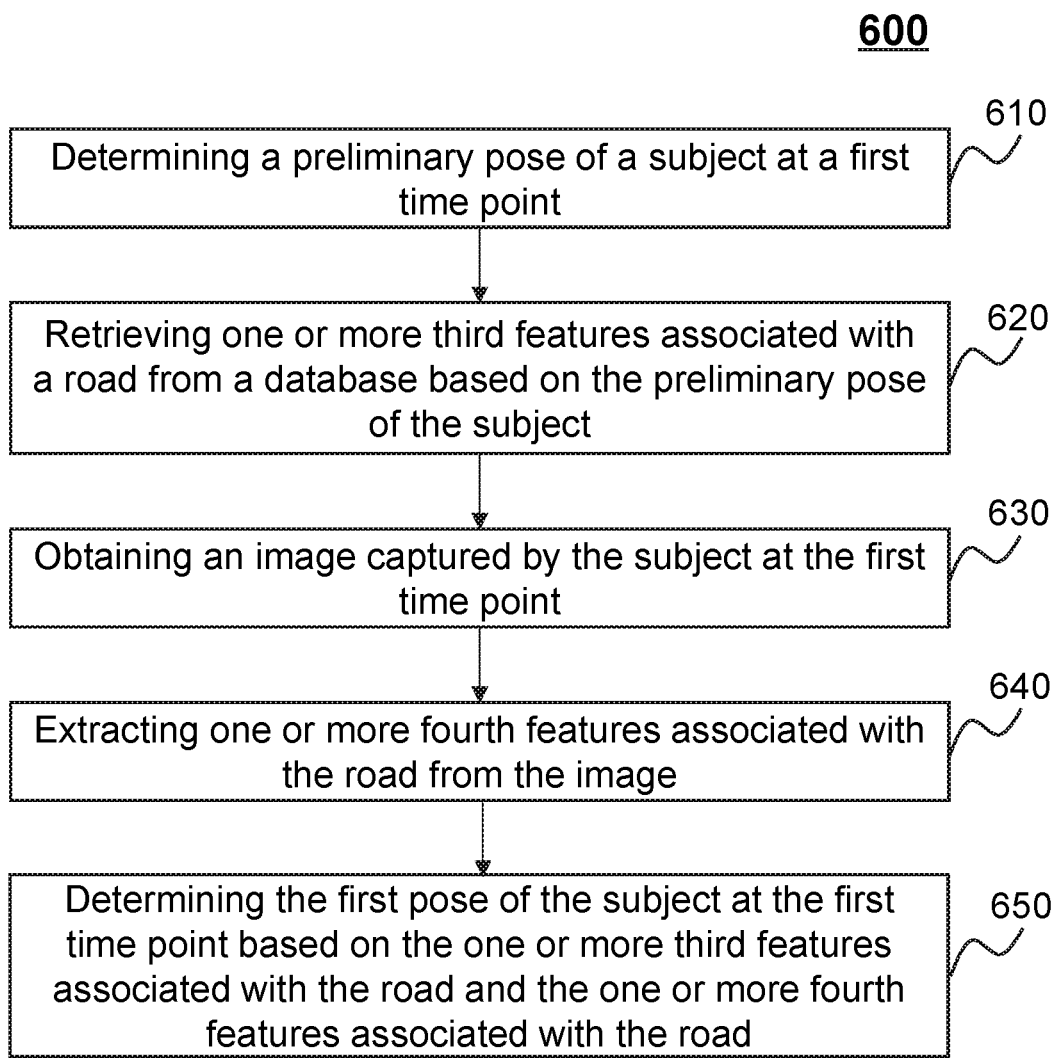
FIG. 6 is a flowchart illustrating another exemplary process for determining a pose of a subject according to some embodiments of the present disclosure.

FIG. 6 is a flowchart illustrating an exemplary process for determining a first pose according to some embodiments of the present disclosure. The process 600 may be executed by the autonomous driving system 100. For example, the process 600 may be implemented as a set of instructions stored in the storage ROM 230 or RAM 240. The processor 220 and/or the modules in FIG. 3 may execute the set of instructions, and when executing the instructions, the processor 220 and/or the modules may be configured to perform the process 600. The operations of the illustrated process presented below are intended to be illustrative. In some embodiments, the process 600 may be accomplished with one or more additional operations not described and/or without one or more of the operations discussed. Additionally, the order in which the operations of the process 600 illustrated in FIG. 6 and described below is not intended to be limiting.

In 610, the computing device 110 (e.g., the pose determination module 340) may determine a preliminary pose of a subject at a first time point. The preliminary pose of the subject may include a preliminary position and/or a preliminary orientation of the subject. In some embodiments, the preliminary position of the subject may be obtained by the GPS, and the preliminary orientation of the subject may be obtained according to the IMU measurements.

In 620, the computing device 110 (e.g., the retrieving module 320) may retrieve one or more third features associated with a road from a database based on the preliminary pose of the subject. Similar to the first/second features described elsewhere in the present disclosure, the one or more third features associated with the road may include one or more attributes of one or more road elements viewed by the subject at the preliminary pose and at the first time point. An attribute of a road element may include a type (e.g., a traffic sign, a traffic light, a road sign, a lane line, a signage) of the road element, a color of the road element, geometrical information (e.g., a shape, a size) of the road element, geographic location information (e.g., a longitude, a latitude, and a height in the geographic coordinate system) of the road element, a relative position (e.g., with respect to other road elements) of the one or more road elements, or the like, or any combination thereof. Relevant descriptions may be found elsewhere in the present disclosure, e.g., FIG. 4A, FIG. 5, and the descriptions thereof.

In 630, the computing device 110 (e.g., the obtaining module 310) may obtain an image captured by the subject at the first time point. In some embodiments, the image captured by the subject at the first time point may refer to the first image frame (i.e., i=1). The second image captured by the subject may include an RGB image, a grayscale image, a depth image, a cloud of points, etc.

In 640, the computing device 110 (e.g., the extraction module 330) may extract one or more fourth features associated with the road from the image. The one or more fourth features associated with the road may include one or more attributes of the one or more road elements in the image. The fourth features may be similar to the first/second features, and relevant descriptions may be found elsewhere in the present disclosure, e.g., FIG. 4A and descriptions thereof. In some embodiments, the computing device 110 may employ different techniques to extract the one or more fourth features associated with the road from the image. Exemplary techniques may include an image recognition technique, a semantic segmentation technique, etc.

In 650, the computing device 110 (e.g., the pose determination module 340) may determine the first pose of the subject at the first time point based on the one or more third features associated with the road and the one or more fourth features associated with the road. In some embodiments, by matching the third features associated with the road with the fourth features associated with the road, the computing device 110 may establish a correspondence relationship between the one or more third features associated with the road and the one or more fourth features associated with the road according to the equation (1). The computing device 110 may then determine the first pose of the subject at the first time point based on the one or more third features associated with the road and the one or more fourth features associated with the road by solving the equation (1).

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, one or more additional operations (e.g., a storing operations) may be added elsewhere in the process 600. In the storing operation, the computing device 110 may store information and/or data associated with the subject in a storage device (e.g., the storage 140) disclosed elsewhere in the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment," "one embodiment," or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "block," "module," "engine," "unit," "component," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a software as a service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution—e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

We claim:

1. A system, comprising:
   at least one storage medium including a set of instructions; and
   at least one processor in communication with the at least one storage medium, wherein when executing the instructions, the at least one processor is configured to direct the system to perform operations including:
   obtaining a first pose of a subject at a first time point;
   retrieving one or more first features associated with a road from a database, the road being viewable by the subject at the first pose and at the first time point;
   obtaining an image captured by the subject at a second time point;
   extracting one or more second features associated with the road from the image; and
   determining a second pose of the subject at the second time point at least based on comparing the one or more first features associated with the road with the one or more second features associated with the road.

2. The system of claim 1, wherein obtaining the first pose of the subject at the first time point comprises:
   determining a preliminary pose of the subject at the first time point;
   retrieving one or more third features associated with the road from the database based on the preliminary pose of the subject;
   obtaining a second image captured by the subject at the first time point;
   extracting one or more fourth features associated with the road from the second image; and
   determining the first pose of the subject at the first time point based on the one or more third features associated with the road and the one or more fourth features associated with the road.

3. The system of claim 2, wherein the at least one processor is further configured to direct the system to perform operations including:
   determining a first location of the subject at the first time point and a second location of the subject at the second time point; and
   determining that the image captured by the subject at the second time point is a key frame on occurrence that a distance between the first location of the subject and the second location of the subject is larger than or equal to a first threshold.

4. The system of claim 2, wherein the at least one processor is further configured to direct the system to perform operations including:
   determining that the image captured by the subject at the second time point is a key frame on occurrence that a match score between the image captured by the subject at the second time point and the second image captured by the subject at the first time point is below a second threshold.

5. The system of claim 1, wherein the one or more first features or second features associated with the road include one or more attributes of a road element.

6. The system of claim 5, wherein the one or more second features include a calculated size of the road element, and wherein determining the second pose of the subject at the second time point at least based on comparing the one or more first features associated with the road with the one or more second features associated with the road comprises:
   obtaining a reference size of the road element; and
   determining the second pose of the subject at the second time point based on the calculated size of the road element and the reference size of the road element.

7. The system of claim 1, wherein determining the second pose of the subject at the second time point at least based on comparing the one or more first features associated with the road with the one or more second features associated with the road comprises:
   aligning the one or more first features with the one or more second features to generate at least one pair of aligned features; and
   determining the second pose of the subject according to a cost function, wherein a cost measure of the cost function includes a distance error between the at least one pair of aligned features.

8. The system of claim 7, wherein the at least one pair of aligned features includes a first aligned feature and a second aligned feature, and the distance error between the at least one pair of aligned features includes a difference between a first position corresponding to the first aligned feature and a second position corresponding to the second aligned feature.

9. The system of claim 1, wherein the database includes a pre-built map.

10. A method implemented on a computing device having at least one storage medium and at least one processor, the method comprising:
   obtaining a first pose of a subject at a first time point;
   retrieving one or more first features associated with a road from a database, the road being viewable by the subject at the first pose and at the first time point;
   obtaining an image captured by the subject at a second time point;
   extracting one or more second features associated with the road from the image; and
   determining a second pose of the subject at the second time point at least based on comparing the one or more first features associated with the road with the one or more second features associated with the road.

11. The method of claim 10, wherein obtaining the first pose of the subject at the first time point comprises:
   determining a preliminary pose of the subject at the first time point;
   retrieving one or more third features associated with the road from the database based on the preliminary pose of the subject;
   obtaining a second image captured by the subject at the first time point;
   extracting one or more fourth features associated with the road from the second image; and
   determining the first pose of the subject at the first time point based on the one or more third features associated with the road and the one or more fourth features associated with the road.

12. The method of claim 11, comprising:
   determining a first location of the subject at the first time point and a second location of the subject at the second time point; and
   determining that the image captured by the subject at the second time point is a key frame on occurrence that a distance between the first location of the subject and the second location of the subject is larger than or equal to a first threshold.

13. The method of claim 11, wherein the method further comprises:
   determining that the image captured by the subject at the second time point is a key frame on occurrence that a match score between the image captured by the subject at the second time point and the second image captured by the subject at the first time point is below a second threshold.

14. The method of claim 10, wherein the one or more first features or second features associated with the road include one or more attributes of a road element.

15. The method of claim 14, wherein the one or more second features include a calculated size of the road element, and wherein determining the second pose of the subject at the second time point at least based on comparing the one or more first features associated with the road with the one or more second features associated with the road comprises:
   obtaining a reference size of the road element; and
   determining the second pose of the subject at the second time point based on the calculated size of the road element and the reference size of the road element.

16. The method of claim 10, wherein determining the second pose of the subject at the second time point at least based on comparing the one or more first features associated with the road with the one or more second features associated with the road comprises:
   aligning the one or more first features with the one or more second features to generate at least one pair of aligned features; and
   determining the second pose of the subject according to a cost function, wherein a cost measure of the cost function includes a distance error between the at least one pair of aligned features.

17. The method of claim 16, wherein the at least one pair of aligned features includes a first aligned feature and a second aligned feature, and the distance error between the at least one pair of aligned features includes a difference between a first position corresponding to the first aligned feature and a second position corresponding to the second aligned feature.

18. The method of claim 10, wherein the database includes a pre-built map.

19. A positioning method, comprising:
   obtaining a pose of a positioning device at a first time point and an image captured at a second time point;
   obtaining one or more attributes of a first road element within a viewing angle range of the image from a pre-built map database based on the pose of the positioning device at the first time point;
   extracting one or more attributes of a second road element from the image captured at the second time point; and
   determining a pose of the positioning device at the second time point based on comparing the one or more attributes of the first road element with the one or more attributes of the second road element.

20. The method of claim 19, further comprising:
   determining that the image captured at the second time point is a key frame.

* * * * *